(12) United States Patent
Mangaiahgari

(10) Patent No.: US 11,670,829 B2
(45) Date of Patent: Jun. 6, 2023

(54) RADAR ASSEMBLY WITH RECTANGULAR WAVEGUIDE TO SUBSTRATE INTEGRATED WAVEGUIDE TRANSITION

(71) Applicant: Aptiv Technologies Limited, St. Michael (BB)

(72) Inventor: Sankara Narayana Mangaiahgari, Singapore (SG)

(73) Assignee: Aptiv Technologies Limited., St. Michael (BB)

( * ) Notice: Subject to any disclaimer, the term of this patent is extended or adjusted under 35 U.S.C. 154(b) by 237 days.

(21) Appl. No.: 17/073,254

(22) Filed: Oct. 16, 2020

(65) Prior Publication Data

US 2021/0036393 A1    Feb. 4, 2021

Related U.S. Application Data

(63) Continuation of application No. 16/583,867, filed on Sep. 26, 2019, now Pat. No. 10,833,385, which is a
(Continued)

(51) Int. Cl.
*H01P 3/12* (2006.01)
*G01S 7/02* (2006.01)
(Continued)

(52) U.S. Cl.
CPC .............. *H01P 3/121* (2013.01); *G01S 7/02* (2013.01); *G01S 13/0209* (2013.01); *H01P 5/024* (2013.01)

(58) Field of Classification Search
None
See application file for complete search history.

(56) References Cited

U.S. PATENT DOCUMENTS 3,462,713 A    8/1969    Knerr
3,579,149 A    5/1971    Ramsey
(Continued)

FOREIGN PATENT DOCUMENTS

CA    2654470    12/2007
CN    1620738    5/2005
(Continued)

OTHER PUBLICATIONS

D. Deslandes and K. Wu, "Integrated transition of coplanar to rectangular waveguides," 2001 IEEE MTT-S International Microwave Sympsoium Digest (Cat. No. 01CH37157), 2001, pp. 619-622 vol. 2, doi: 10.1109/MWSYM.2001.966971. (Year: 2001).*
(Continued)

*Primary Examiner* — Bernarr E Gregory
(74) *Attorney, Agent, or Firm* — Sawtooth Patent Group PLLC

(57) ABSTRACT

A radar assembly includes a rectangular-waveguide (RWG) and a printed-circuit-board. The rectangular-waveguide (RWG) propagates electromagnetic energy in a transverse electric mode (TE10) and in a first direction. The printed-circuit-board includes a plurality of conductor-layers oriented parallel to each other. The printed-circuit-board defines a substrate-integrated-waveguide (SIW) that propagates the electromagnetic energy in a transverse electric mode (TE10) and in a second direction perpendicular to the first direction, and defines a transition that propagates the electromagnetic energy between the rectangular-wave-guide and the substrate-integrated-waveguide. The transition includes apertures defined by at least three of the plurality of conductor-layers.

20 Claims, 2 Drawing Sheets

Related U.S. Application Data continuation of application No. 15/427,769, filed on Feb. 8, 2017, now Pat. No. 10,468,736.

(51) Int. Cl.
 *G01S 13/02* (2006.01)
 *H01P 5/02* (2006.01)
 *G01S 13/00* (2006.01)

(56) References Cited

U.S. PATENT DOCUMENTS

| | | | |
|---|---|---|---|
| 4,157,516 A | 6/1979 | Van De Grijp | |
| 4,453,142 A | 6/1984 | Murphy | |
| 4,562,416 A | 12/1985 | Sedivec | |
| 5,065,123 A | 11/1991 | Heckaman et al. | |
| 5,414,394 A * | 5/1995 | Gamand | H01P 5/107 333/34 |
| 5,982,250 A * | 11/1999 | Hung | H01P 5/107 257/E23.062 |
| 5,982,256 A | 11/1999 | Uchimura et al. | |
| 5,986,527 A | 11/1999 | Ishikawa et al. | |
| 6,489,855 B1 | 12/2002 | Kitamori et al. | |
| 6,658,233 B1 | 12/2003 | Ikeda | |
| 6,794,950 B2 | 9/2004 | Du Tolt et al. | |
| 6,867,660 B2 | 3/2005 | Kitamori et al. | |
| 6,958,662 B1 | 10/2005 | Salmela et al. | |
| 7,276,988 B2 * | 10/2007 | Stoneham | H01P 5/107 333/33 |
| 7,973,616 B2 | 7/2011 | Shijo et al. | |
| 7,994,879 B2 | 8/2011 | Kim et al. | |
| 8,013,694 B2 | 9/2011 | Hiramatsu et al. | |
| 8,089,327 B2 | 1/2012 | Margomenos et al. | |
| 8,159,316 B2 | 4/2012 | Miyazato et al. | |
| 8,680,936 B2 * | 3/2014 | Purden | H01P 5/107 333/254 |
| 8,692,731 B2 | 4/2014 | Lee et al. | |
| 9,007,269 B2 | 4/2015 | Lee et al. | |
| 9,450,281 B2 | 9/2016 | Kim | |
| 9,673,532 B2 | 6/2017 | Cheng et al. | |
| 9,935,065 B1 | 4/2018 | Baheti et al. | |
| 10,468,736 B2 | 11/2019 | Mangaiahgari | |
| 10,775,573 B1 | 9/2020 | Hsu et al. | |
| 10,833,385 B2 | 11/2020 | Mangaiahgari et al. | |
| 2002/0021197 A1 | 2/2002 | Elco | |
| 2004/0069984 A1 | 4/2004 | Estes et al. | |
| 2006/0113598 A1 | 6/2006 | Chen et al. | |
| 2006/0145777 A1 | 7/2006 | Mueller | |
| 2008/0129409 A1 | 6/2008 | Nagaishi et al. | |
| 2008/0150821 A1 | 6/2008 | Koch et al. | |
| 2009/0207090 A1 | 8/2009 | Pettus et al. | |
| 2009/0243762 A1 | 10/2009 | Chen et al. | |
| 2010/0193935 A1 | 8/2010 | Lachner et al. | |
| 2011/0140810 A1 * | 6/2011 | Lei | H01P 3/121 333/239 |
| 2011/0140979 A1 * | 6/2011 | Dayan | H01P 3/121 333/208 |
| 2012/0013421 A1 | 1/2012 | Hayata | |
| 2012/0050125 A1 | 3/2012 | Leiba et al. | |
| 2012/0068316 A1 | 3/2012 | Ligander | |
| 2012/0163811 A1 | 6/2012 | Doany et al. | |
| 2012/0242421 A1 | 9/2012 | Robin et al. | |
| 2012/0256707 A1 * | 10/2012 | Lei | H01P 3/121 216/13 |
| 2012/0256796 A1 | 10/2012 | Leiba | |
| 2013/0057358 A1 | 3/2013 | Anthony et al. | |
| 2013/0256849 A1 | 10/2013 | Danny et al. | |
| 2014/0015709 A1 | 1/2014 | Shijo et al. | |
| 2014/0091884 A1 | 4/2014 | Flatters | |
| 2014/0106684 A1 | 4/2014 | Burns et al. | |
| 2015/0097633 A1 | 4/2015 | Devries et al. | |
| 2015/0229017 A1 | 8/2015 | Suzuki et al. | |
| 2015/0357698 A1 | 12/2015 | Kushta | |
| 2015/0364804 A1 | 12/2015 | Tong et al. | |
| 2015/0364830 A1 | 12/2015 | Tong et al. | |
| 2016/0043455 A1 | 2/2016 | Seler et al. | |
| 2016/0049714 A1 | 2/2016 | Ligander et al. | |
| 2016/0111764 A1 * | 4/2016 | Kim | H01P 5/024 333/248 |
| 2016/0118705 A1 | 4/2016 | Tang et al. | |
| 2016/0204495 A1 | 7/2016 | Takeda et al. | |
| 2016/0276727 A1 | 9/2016 | Dang et al. | |
| 2016/0293557 A1 | 10/2016 | Topak et al. | |
| 2016/0301125 A1 | 10/2016 | Kim et al. | |
| 2017/0084554 A1 | 3/2017 | Dogiamis et al. | |
| 2017/0099705 A1 | 4/2017 | Mazzon | |
| 2017/0324135 A1 | 11/2017 | Blech et al. | |
| 2018/0131084 A1 | 5/2018 | Park et al. | |
| 2018/0226709 A1 | 8/2018 | Mangaiahgari | |
| 2018/0233465 A1 | 8/2018 | Spella et al. | |
| 2018/0284186 A1 | 10/2018 | Chadha et al. | |
| 2018/0343711 A1 | 11/2018 | Wixforth et al. | |
| 2018/0351261 A1 | 12/2018 | Kamo et al. | |
| 2019/0006743 A1 | 1/2019 | Kirino et al. | |
| 2019/0013563 A1 | 1/2019 | Takeda et al. | |
| 2019/0207286 A1 | 7/2019 | Moallem | |
| 2020/0021001 A1 | 1/2020 | Mangaiahgairi | |
| 2020/0235453 A1 | 7/2020 | Lang | |
| 2020/0343612 A1 | 10/2020 | Shi | |
| 2021/0036393 A1 | 2/2021 | Mangaiahgari | |

FOREIGN PATENT DOCUMENTS

| | | |
|---|---|---|
| CN | 1682404 A | 10/2005 |
| CN | 2796131 | 7/2006 |
| CN | 201383535 | 1/2010 |
| CN | 102696145 A | 9/2012 |
| CN | 103515682 | 1/2014 |
| CN | 104900956 | 9/2015 |
| CN | 105098295 A | 11/2015 |
| CN | 105609909 | 5/2016 |
| CN | 105680133 | 6/2016 |
| CN | 105958167 | 9/2016 |
| CN | 109750201 A | 5/2019 |
| CN | 209389219 | 9/2019 |
| DE | 102016213202 A1 | 1/2018 |
| DE | 102019200893 | 7/2020 |
| EP | 2500978 | 9/2012 |
| EP | 2843758 | 3/2015 |
| EP | 2945222 A1 | 11/2015 |
| EP | 3460903 | 3/2019 |
| GB | 2489950 | 10/2012 |
| JP | 2003243902 A | 8/2003 |
| JP | 2003289201 | 10/2003 |
| KR | 100846872 | 5/2008 |
| KR | 20080044752 A | 5/2008 |
| WO | 2013189513 | 12/2013 |
| WO | 2018003932 | 1/2018 |

OTHER PUBLICATIONS

"Foreign Office Action", CN Application No. 201810122408.4, dated Jan. 26, 2022, 15 pages.

"Foreign Office Action", CN Application No. 201810122408.4, dated May 6, 2022, 15 pages.

"Foreign Office Action", CN Application No. 201810122408.4, dated Oct. 18, 2021, 19 pages.

"Non-Final Office Action", U.S. Appl. No. 16/829,409, dated Oct. 14, 2021, 13 pages.

"Non-Final Office Action", U.S. Appl. No. 17/061,675, dated Dec. 20, 2021, 4 pages.

Wang, et al., "Mechanical and Dielectric Strength of Laminated Epoxy Dielectric Graded Materials", Mar. 2020, 15 pages.

"Extended European Search Report", EP Application No. 20166797, dated Sep. 16, 2020, 11 pages.

"Foreign Office Action", CN Application No. 201810122408.4, dated Jun. 2, 2021, 15 pages.

"Extended European Search Report", EP Application No. 18153137.7, dated Jun. 15, 2018, 8 pages.

"Non-Final Office Action", U.S. Appl. No. 16/583,867, dated Feb. 18, 2020, 8 pages.

(56) References Cited

OTHER PUBLICATIONS

"Non-Final Office Action", U.S. Appl. No. 15/427,769, dated Nov. 13, 2018, 8 pages.
"Notice of Allowance", U.S. Appl. No. 15/427,769, dated Jun. 28, 2019, 9 pages.
"Notice of Allowance", U.S. Appl. No. 16/583,867, dated Jul. 8, 2020, 8 Pages.
Jankovic, et al., "Stepped Bend Substrate Integrated Waveguide to Rectangular Waveguide Transitions", Jun. 2016, 2 pages.
"Foreign Office Action", CN Application No. 201810122408.4, dated Sep. 20, 2022, 19 pages.
Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.
"Extended European Search Report", EP Application No. 21203201. 5, dated Apr. 7, 2022, 12 pages.
"Foreign Office Action", CN Application No. 202111321802.9, dated Nov. 22, 2022, 17 pages.
Bauer, et al., "A wideband transition from substrate integrated waveguide to differential microstrip lines in multilayer substrates", Sep. 2010, pp. 811-813.
Deutschmann, et al., "A Full W-Band Waveguide-to-Differential Microstrip Transition", Jun. 2019, pp. 335-338.
Giese, et al., "Compact Wideband Single-ended and Differential Microstrip-to-waveguide Transitions at W-band", Jul. 2015, 4 pages.
Tong, et al., "A Vertical Transition Between Rectangular Waveguide and Coupled Microstrip Lines", IEEE Microwave and Wireless Components Letters, vol. 22, No. 5, May 2012, pp. 251-253.
Tong, et al., "A Wide Band Transition from Waveguide to Differential Microstrip Lines", Dec. 2008, 5 pages.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Yuasa, et al., "A millimeter wave wideband differential line to waveguide transition using short ended slot line", Oct. 2014, pp. 1004-1007.
"Extended European Search Report", EP Application No. 22188348. 1, dated Mar. 14, 2023, 8 pages.
"Foreign Office Action", CN Application No. 201810122408.4, dated Jan. 30, 2023, 21 pages.
"Foreign Office Action", CN Application No. 202111321802.9, dated Mar. 31, 2023, 16 pages.
Henawy, et al., "Integrated Antennas in eWLB Packages for 77 GHZ and 79 GHZ Automotive Radar Sensors", 2011 41st European Microwave Conference, Oct. 10, 2011, pp. 1312-1315.
Schellenberg, et al., "CAD Models for Suspended and Inverted Microstrip", IEEE Transactions on Microwave Theory and Techniques, vol. 43, No. 6, Jun. 1995, pp. 1247-1252.

* cited by examiner

RADAR ASSEMBLY WITH RECTANGULAR WAVEGUIDE TO SUBSTRATE INTEGRATED WAVEGUIDE TRANSITION

CROSS-REFERENCE TO RELATED APPLICATIONS

This is a continuation application and claims the benefit under 35 U.S.C. § 120 of U.S. patent application Ser. No. 16/583,867, filed Sep. 26, 2019, now U.S. Pat. No. 10,833,385, which in turn claims priority to U.S. patent application Ser. No. 15/427,769, filed Feb. 8, 2017, now U.S. Pat. No. 10,468,736, issued Nov. 5, 2019, the entire disclosures of which are hereby incorporated herein by reference.

TECHNICAL FIELD OF INVENTION

This disclosure generally relates to a radar assembly, and more particularly relates to a transition between a rectangular-waveguide (RWG) and a substrate-integrated-waveguide (SIW) where the transition includes apertures defined by at least three of a plurality of conductor-layers of a printed circuit board that also defines the SIW.

BACKGROUND OF INVENTION

Wideband Transitions are used in wide band radar systems such as Automotive Radar. Known transitions with sufficient bandwidths include undesirably expensive waveguide flanges or metal structures, where critical tolerances add to the cost.

SUMMARY OF THE INVENTION

Described herein is a wideband transition that is formed using standard printed circuit board (PCB) processes, so is able to avoid using expensive waveguide flanges or metal structures. The non-limiting example described herein provides a transition between a Rectangular Waveguide (RWG) to a Substrate Integrated Waveguide (SIW) suitable for use with, for example, electromagnetic energy having a 16 GHz bandwidth around a 79 GHz fundamental frequency. The transition is suitable for compact multilayer printed circuit board (PCB) construction like Ultra Short Range Radar (USRR), using standard PCB fabrication processes.

In accordance with one embodiment, a radar assembly is provided. The assembly includes a rectangular-waveguide (RWG) and a printed-circuit-board. The rectangular-waveguide (RWG) propagates electromagnetic energy in a transverse electric mode (TE10) and in a first direction. The printed-circuit-board includes a plurality of conductor-layers oriented parallel to each other. The printed-circuit-board defines a substrate-integrated-waveguide (SIW) that propagates the electromagnetic energy in a transverse electric mode (TE10) and in a second direction perpendicular to the first direction, and defines a transition that propagates the electromagnetic energy between the rectangular-wave-guide and the substrate-integrated-waveguide. The transition includes apertures defined by at least three of the plurality of conductor-layers.

Further features and advantages will appear more clearly on a reading of the following detailed description of the preferred embodiment, which is given by way of non-limiting example only and with reference to the accompanying drawings.

BRIEF DESCRIPTION OF THE DRAWINGS

The present invention will now be described, by way of example with reference to the accompanying drawings, in which.

DETAILED DESCRIPTION

Figure 1:
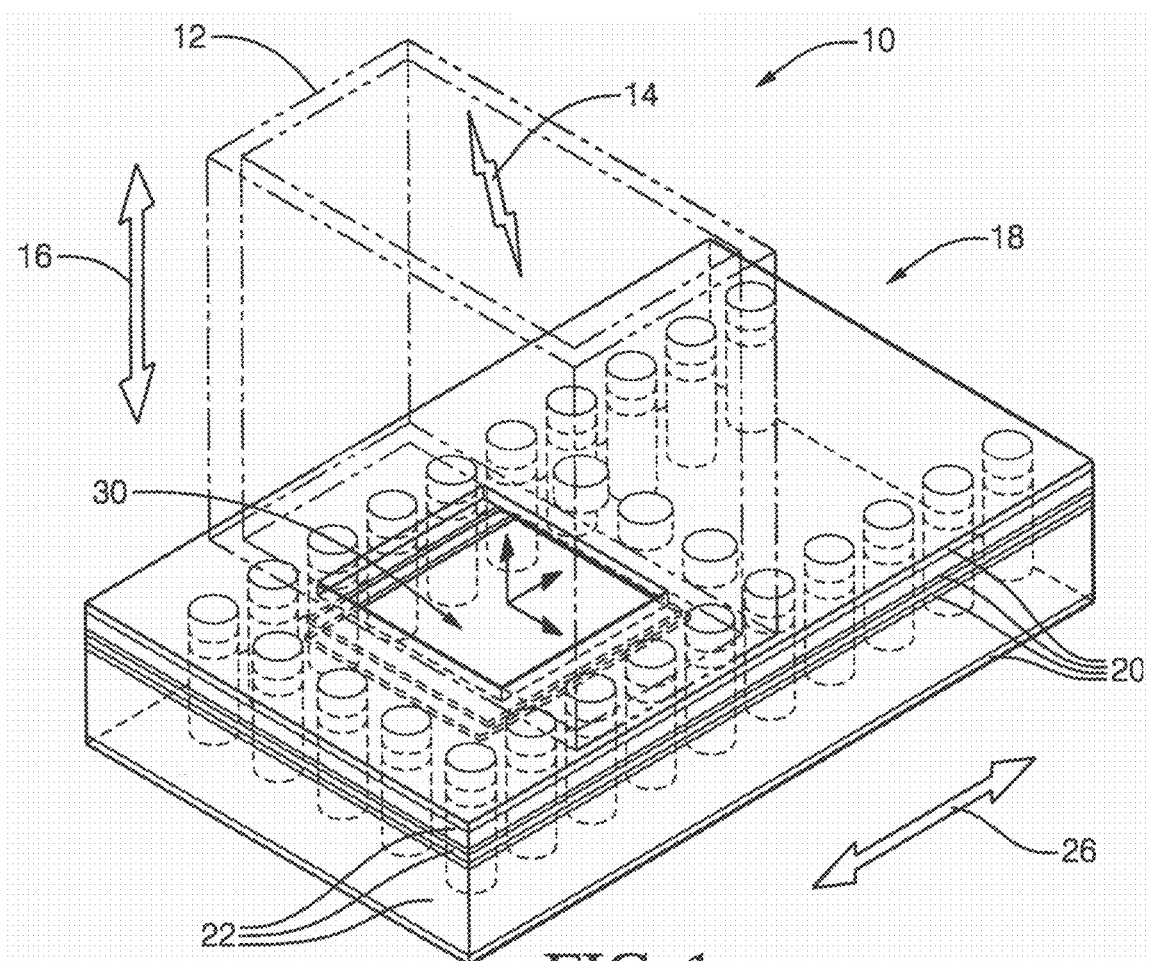
FIG. 1 is an isometric view of a radar assembly in accordance with one embodiment.
Figure 2:
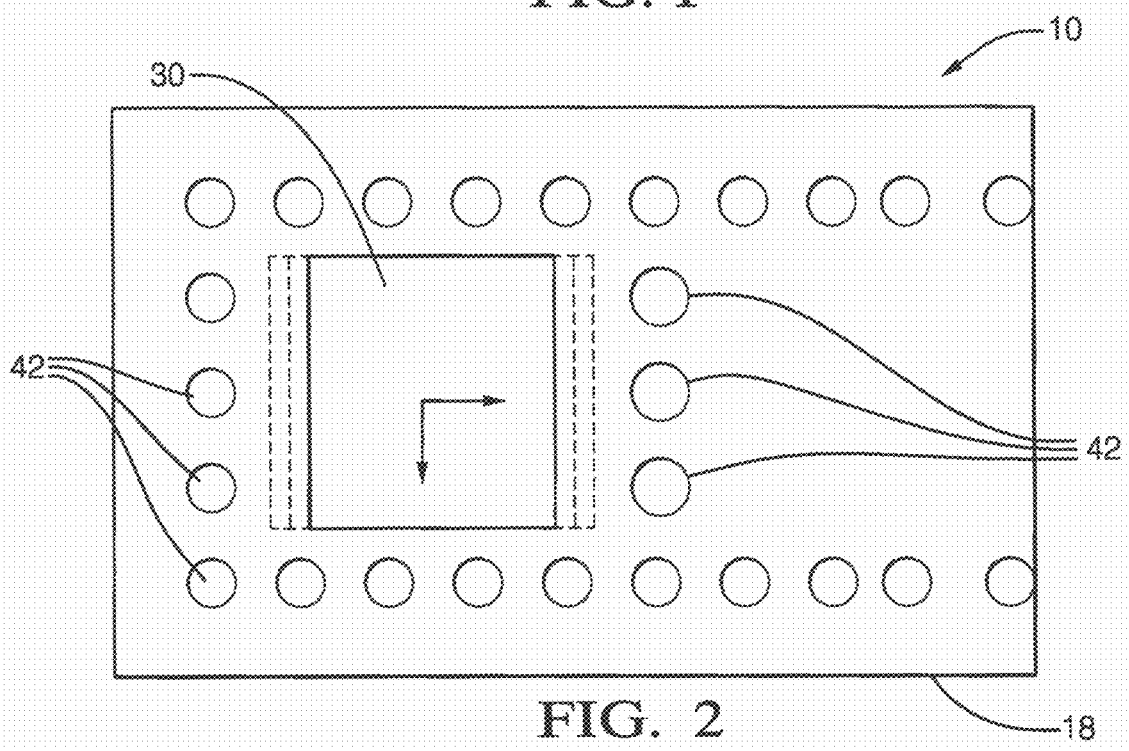
FIG. 2 is top view of part of the radar assembly of FIG. 1 in accordance with one embodiment.
Figure 3:
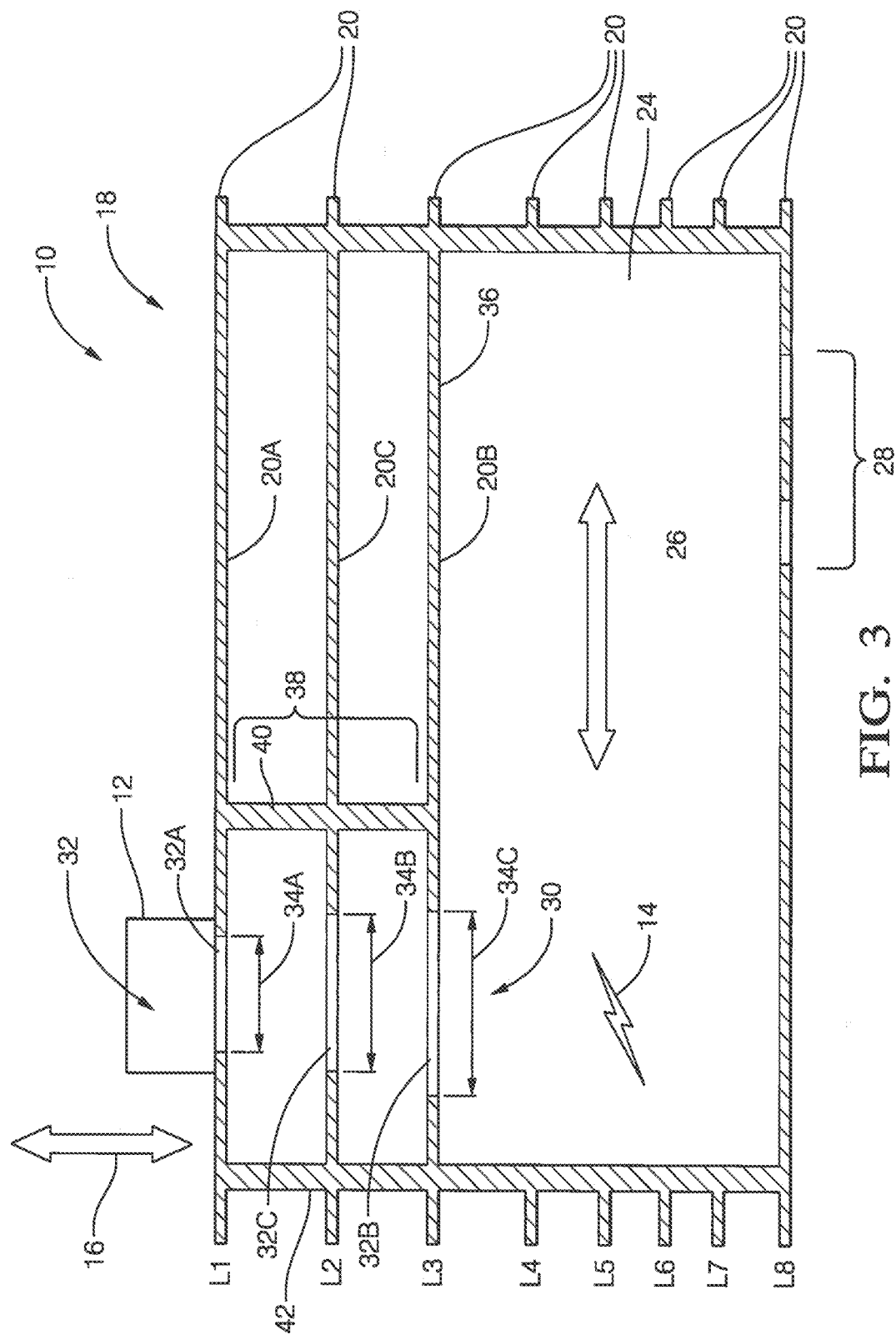
FIG. 3 is sectional side view of part of the radar assembly of FIG. 1 in accordance with one embodiment.

FIG. 1, FIG. 2, and FIG. 3 cooperate to illustrate a non-limiting example of a radar assembly 10, hereafter referred to as the assembly 10. The assembly 10 may be part of a larger radar system (not shown), where the assembly 10 provides a transition means between different types of waveguides used to propagate electromagnetic energy in the radar system from one location to another location.

The assembly 10 includes a rectangular-waveguide 12 or RWG 12 that propagates the electromagnetic energy 14 in a transverse electric mode (TE10) and in a first direction 16. The first direction 16 is illustrated as a double-ended arrow because, as will be recognized by those in the art, the RWG 12 can be used to propagate the electromagnetic energy 14 into (i.e. towards) the assembly 10, or out of (i.e. away from) the assembly 10. The physical size of the RWG 12 is selected based on the operating frequency of the radar system using well-known design rules.

The assembly 10 also includes a printed-circuit-board 18 that includes a plurality of conductor-layers 20 oriented parallel to each other. The physical dimensions and materials used for dielectric-layers 22 and the plurality of conductor-layers 20 are selected based on the operating frequency of the radar system using well-known design rules. By way of example and not limitation, the plurality of conductor-layers 20 may include eight conductor layers: L1, L2, L3, L4, L5, L6, L7, and L8 (FIG. 3). Some of these conductor layers (e.g. L3-L8) may be configured (e.g. processed using known photo-etching techniques) to define a substrate-integrated-waveguide 24 or SIW 24 that propagates the electromagnetic energy 14 in or using a transverse electric mode (TE10) to propagate the electromagnetic energy 14 in a second direction 26 perpendicular to the first direction 16. In this example layer L8 is further configured to define a slot-radiator 28 that may be used to couple the electromagnetic energy 14 from the SIW 24 to, for example, and antenna (not shown).

The assembly 10, or more specifically the printed-circuit-board 18, also includes or defines a transition 30 that propagates the electromagnetic energy 14 between the rectangular-wave-guide 12 and the substrate-integrated-waveguide 24. As noted above, it is contemplated that the electromagnetic energy 14 could be in either direction; either from the rectangular-wave-guide 12 to the substrate-integrated-waveguide 24, or from the substrate-integrated-waveguide to the rectangular-wave-guide 12. The transition 30 includes a plurality of apertures 32 defined by at least three (e.g. L1-L3) of the plurality of conductor-layers 20. That is, the transition 30 includes or is defined by at least three instances of apertures. In this example, the transition 30 includes or is defined by a first layer 20A (L1) of the plurality of conductor-layers 20 that is adjacent to or in contact with the rectangular-waveguide 12. The first layer 20A defines a first aperture 32A characterized by a first-size 34. The transition 30 also includes a last layer 20B (L3) of the plurality of conductor-layers 20 that is adjacent to the substrate-integrated-waveguide 24, where the last layer 20B also defines a horizontal-boundary 36 of the substrate-integrated-waveguide 24. With respect to the transition 30, the last layer 20B defines a last aperture 32B characterized by a last-size 34B that is greater than the first-size 34A.

The transition 30 also includes or is defined by one or more instances of an intermediate layer 20C of the plurality of conductor-layers 20 located between the first layer 20A and the last layer 20B of the transition 30. The intermediate layer 20C defines an intermediate aperture 32C characterized by an intermediate-size 34C with a value between the last-size 34B and the first-size 34A. It is contemplated that the transition 30 could have more than a single instance of the intermediate layer 20C between the first layer 20A and the last layer 20B so that the transition 30 would include or be formed by more than three instances of the apertures 32. That is, it is contemplated that the transition 30 could consist of additional apertures in addition to the intermediate aperture 32C between the first aperture 32A and the last aperture 32B. The progression or variation of the sizes of the apertures 32 may be determine or optimized using known design techniques. For example, the dimensions of the apertures 32 may be optimized on 3D-EM software HFSS for efficient transfer of energy and impedance matching between the RWG 12 and the SIW 24 over wide frequency range.

In order to reduce the amount of the electromagnetic energy 14 that leaks out of the transition 30 so is not communicated between the rectangular-wave-guide 12 and the substrate-integrated-waveguide 24. The transition 30 may also include one or more instances of a short wall 38 that serves to define a vertical-boundary 40 of the transition 30. The short wall 38 may be formed of an arrangement of vias 42, which may be part of the vias 42 used to define the SIW 24.

Accordingly, a radar assembly (the assembly 10) is provided. The assembly 10 provides a wideband transition (the transition 30) between the rectangular waveguide 12 (RWG 12) to the substrate integrated waveguide 24 (SIW 24) using the inner layers of a multilayer PCB (printed-circuit-board 18) for operation in the W-band of the electromagnetic spectrum. The transition is formed by a series of apertures through conductive layers (e.g. L1 thru L3). The transition 30 is advantageously and economically provided by using a multi-layered PCB processed using standard PCB processing technology typically used for the W-band. As such, no special flanges or metal structures are necessary, so the expense and critical tolerances associated features are avoided.

While this invention has been described in terms of the preferred embodiments thereof, it is not intended to be so limited, but rather only to the extent set forth in the claims that follow.

What is claimed is:

1. A method of manufacturing a printed circuit board (PCB) configured for use in a radar assembly, the method comprising:

forming a bottom substrate integrated waveguide (SIW) conductive layer configured to interface with an antenna of the radar assembly;

forming a plurality of SIW dielectric layers interleaved with a plurality of SIW conductive layers on top of the bottom SIW conductive layer starting with a bottom SIW dielectric layer and ending with a top SIW dielectric layer, the SIW dielectric layers and the SIW conductive layers forming an SIW configured to propagate electromagnetic energy in a first direction that is parallel to a plane of the PCB; and forming one or more waveguide transition conductive layers interleaved with one or more waveguide transition dielectric layers on top of the top SIW dielectric layer starting with a bottom waveguide transition conductive layer of the waveguide transition conductive layers and ending with a top waveguide transition conductive layer of the waveguide transition conductive layers, the waveguide transition conductive layers comprising respective apertures, an aperture of the top waveguide transition conductive layer configured to interface with a rectangular integrated waveguide that propagates the electromagnetic energy in a second direction that is perpendicular to the first direction and normal to the plane of the PCB, the waveguide transition conductive layers and the waveguide transition dielectric layers forming a transition configured to direct the electromagnetic energy between the SIW and the rectangular waveguide.

2. The method of claim 1, wherein forming the conductive layers comprises using photo-etching techniques.

3. The method of claim 1, wherein forming the waveguide transition conductive layers comprises forming at least three waveguide transition conductive layers.

4. The method of claim 1, wherein forming the dielectric layers comprises forming the dielectric layers such that at least two of the dielectric layers have different thicknesses.

5. The method of claim 4, wherein forming the waveguide transition dielectric layers comprises forming the waveguide transition dielectric layers such that the waveguide transition dielectric layers have similar thicknesses.

6. The method of claim 1, wherein forming the SIW dielectric layers comprises forming a quantity of the SIW dielectric layers that is at least double a quantity of the waveguide transition dielectric layers.

7. The method of claim 1, wherein forming the bottom conductive layer comprises forming a slot radiator configured to couple the electromagnetic energy from the SIW to the antenna.

8. The method of claim 1, further comprising forming vias through the dielectric layers effective to electrically couple the conductive layers.

9. The method of claim 8, wherein forming the vias comprises filling holes formed in the dielectric layers with a conductive material.

10. The method of claim 8, wherein forming the vias comprises forming a plurality of the vias that form perimeter walls through the dielectric layers.

11. The method of claim 10, wherein forming the vias further comprises forming another plurality of vias that form a short wall through the waveguide transition dielectric layers.

12. The method of claim 11, wherein the short wall bisects the waveguide transition dielectric layers proximate the apertures.

13. The method of claim 1, wherein forming the waveguide transition conductive layers comprises forming the apertures such that the apertures have different sizes.

14. A method of manufacturing a printed circuit board (PCB) configured for use in a radar assembly, the method comprising:

forming one or more waveguide transition dielectric layers interleaved with a plurality of waveguide transition conductive layers starting with a bottom waveguide transition conductive layer of the waveguide transition conductive layers and ending with a top waveguide transition conductive layer of the waveguide transition conductive layers, the waveguide transition conductive layers comprising respective apertures, the aperture of the bottom waveguide transition conductive layer configured to interface with a rectangular integrated waveguide of the radar assembly that propagates electromagnetic energy in a first direction that is normal to a plane of the PCB; and forming a plurality of substrate integrated waveguide (SIW) dielectric layers interleaved with a plurality of SIW conductive layers on top of the top waveguide transition conductive layer starting with an SIW dielectric layer and ending with a top SIW conductive layer of the SIW conductive layers, the SIW dielectric layers and the SIW conductive layers forming an SIW configured to propagate electromagnetic energy in a second direction that is perpendicular to the first direction and parallel to a plane of the PCB, the top SIW conductive layer configured to interface with an antenna of the radar assembly.

15. The method of claim 14, wherein the PCB is configured to automotive use.

16. The method of claim 14, wherein forming the dielectric layers comprises forming the dielectric layers such that at least two of the dielectric layers have different thicknesses.

17. The method of claim 14, wherein forming the waveguide transition conductive layers comprises forming the apertures such that the apertures have different sizes.

18. The method of claim 14, wherein forming the top SIW conductive layer comprises forming a slot radiator configured to couple the electromagnetic energy from the SIW to the antenna.

19. The method of claim 14, further comprising forming vias through the dielectric layers effective to electrically couple the conductive layers, wherein forming the vias comprises forming a plurality of the vias that form perimeter walls through the dielectric layers.

20. The method of claim 19, wherein forming the vias further comprises forming another plurality of vias that form a short wall through the waveguide transition dielectric layers and that bisects the waveguide transition dielectric layers proximate the apertures.

\* \* \* \* \*